US006915488B2

(12) United States Patent
Omori et al.

(10) Patent No.: US 6,915,488 B2
(45) Date of Patent: Jul. 5, 2005

(54) OPERATION INSTRUCTION SYSTEM AND COMPUTER READABLE STORAGE MEDIUM TO BE USED FOR THE SAME

(75) Inventors: Takahiro Omori, Tokyo (JP); Kazuya Kubo, Tokyo (JP); Kensuke Yoshitomi, Tokyo (JP)

(73) Assignee: Konami Corporation, Tokyo (JP)

( * ) Notice: Subject to any disclaimer, the term of this patent is extended or adjusted under 35 U.S.C. 154(b) by 701 days.

(21) Appl. No.: 09/867,022

(22) Filed: May 29, 2001

(65) Prior Publication Data

US 2002/0054127 A1 May 9, 2002

(30) Foreign Application Priority Data

Jun. 1, 2000 (JP) ....................................... 2000-165074

(51) Int. Cl.[7] ............................. G06F 3/00; G06F 9/00; G06F 17/00; G09G 13/00; G09B 15/08

(52) U.S. Cl. ....................... 715/773; 715/744; 715/747; 434/227; 84/478

(58) Field of Search ................................ 345/771, 773, 345/839, 815, 744, 970; 434/227; 84/478; 715/746, 747

(56) References Cited

U.S. PATENT DOCUMENTS 5,113,517 A * 5/1992 Beard et al. .................. 703/23
5,270,475 A 12/1993 Weiss et al.
5,544,562 A 8/1996 Jeon
5,585,583 A 12/1996 Owen
5,825,362 A * 10/1998 Retter ........................ 345/854
5,886,273 A * 3/1999 Haruyama .................. 84/478
6,005,180 A 12/1999 Masuda
6,388,181 B2 * 5/2002 Moe ......................... 84/477 R

FOREIGN PATENT DOCUMENTS

JP 4-114559 4/1992
JP 7-36446 2/1995
JP 8-305356 11/1996
JP 9-6305 1/1997

* cited by examiner

*Primary Examiner*—John Cabeca
*Assistant Examiner*—Blaine Basom
(74) *Attorney, Agent, or Firm*—Jordan and Hamburg LLP

(57) ABSTRACT

A display device system for driving a display having one of a plurality of predetermined sizes provides a scalable instruction picture to instruct an operator in operation of input devices. The system includes a device for accepting an operator input selecting a scaling factor to adjust the size of the instruction picture such that indicators in the instruction picture are arranged at spacings substantially equal to spacing of the input devices. In an embodiment, the size of the instruction picture is only adjusted in a width wise horizontal direction. Furthermore, scaling indicators corresponding to a plurality of predetermined display sizes are optionally provided to permit the user to select a scaling factor corresponding to the display.

8 Claims, 6 Drawing Sheets

OPERATION INSTRUCTION SYSTEM AND COMPUTER READABLE STORAGE MEDIUM TO BE USED FOR THE SAME

BACKGROUND OF THE INVENTION

The present invention relates to an operation instruction system capable of being used in a computer game machine or the like and a storage medium to be used for such game machine.

As an amusement system using a computer, there is provided a system which displays, on a screen, a picture containing an operation instruction picture associated with an input device, generates a visual change in the operation instruction picture to instruct to an operator an operation position of the input device, and evaluates a fidelity of the operator's operation corresponding to the instruction, thereby giving points thereto. For example, there is disclosed, in Japanese Patent Laid-open Publication HEI No. 8-305356, a system which uses a keyboard as an input device, displays a picture of the keyboard on a display device and generates visual changes in an operation instruction picture to thereby allow an operator to grasp which key should be operated.

In the above described traditional system, a ratio of the operation instruction picture to the entire picture is fixed at a certain value, and the operator cannot adjust that ratio. On the other hand, a screen size of a display device is variable in a household game machine or in a personal computer, so that an actual size of the operation instruction picture is varied in accordance with the screen size of the display device. It means that a relationship between a size of the input device and a size of the operation instruction picture seen on the screen of the display device differs in accordance with the screen size of the display device, and it may cause a possibility to obstruct the operator to grasp a correspondence relationship between the input device and the operation instruction picture.

With respect to the input device, as it is comprehensible when citing an instance of keyboards for personal computers, the size of the input devices differ from each other, even though the arrangement of operation portions of each keyboard is identical with each other. Accordingly, depending on the size of the input device, similarly to the above discussed case, there may cause a possibility to obstruct the operator to grasp a correspondence relationship between the input device and the operation instruction picture.

There has been provided a display device capable of changing the size of its display area, and it is possible to change the size of the operation instruction picture by using such adjustment function. However, in such case, the entire picture seen on the display device is enlarged or reduced, and the size of a portion that is needless to be adjusted also varies, and it cause a disadvantage of, for example, making characters in the picture hard to read. Also, there is no way to adjust in the display device which cannot change the size of the display area.

SUMMARY OF THE INVENTION

It is, therefore, an object of the present invention to provide an operation instruction system capable of properly setting a correspondence relationship between an input device and an operation instruction picture, and a storage medium suitable for being used in such system.

To achieve the above object, there is provided an operation instruction system comprising: a device for causing a display device to display, in a display area thereof, an operation instruction picture associated with an operation object range defined in at least a portion of an input device; a device for generating a visual change in the operation instruction picture to instruct an operator in an operation position of the input device; and a device for changing a ratio of the operation instruction picture in the display area in accordance with an instruction from the operator.

According to this operation instruction system, it is possible to change the size of the operation instruction picture in accordance with the instruction from the operator, so that a correspondence relationship between the input device and the operation instruction picture can be set to a state preferable for the operator. The correspondence relationship between the operation object range of the input device and the operation instruction picture may be determined in such a manner that the operator can grasp a positional correspondence relationship between the operation object range and the operation instruction device through his or her sight. The visual change to be generated in the operation instruction picture may be generated by various means such as means for generating a change like a dynamic picture on a specific position in the operation instruction picture to thereby indicate an operation, means for changing colors, means for lighting, means for blinking, or the like.

In the operation instruction system, a plurality of operation portions may be provided in the operation object range of the input device, and a plurality of operation instruction portions, which are associated with the plurality of operation portions, respectively, may be provided in the operation instruction picture in an arrangement correlative to an arrangement of the plurality of operation portions. In this case, there is a correlative relationship between the arrangement of the operation portions of the input device and the arrangement of the operation instruction portions in the operation instruction picture. Therefore, the operator can grasp a correspondence relationship between the operation portions and the operation instruction portions at first sight. Incidentally, it is preferable to create the one-to-one relationship between the operation portions on the input device and the operation instruction portions in the operation instruction picture, but it may acceptable to associate one of the operation instruction portions with the plurality of operation portions. For example, the correspondence relationship may be created by providing a right-and-left pair of operation instruction portions in the operation instruction picture, and using the right side operation instruction portion to instruct the operator in operations of the operation portions to be done with the right hand, while using the left side operation instruction portion to instruct the operator in operations of the operation portions to be done with the left hand. The operation portions is not limited to those to be operated by hands, but may be operated by foot.

The plurality of operation portions may be provided to be arranged in at least one direction, and the device for changing may change, in accordance with the instruction from the operator, a size of the operation instruction picture with respect to an arrangement direction of the plurality of operation instruction portions, said arrangement direction corresponding to an arrangement direction of the plurality of operation portions. In such embodiment, it is possible to properly establish a relationship between a width occupied by the operation portions in their arrangement direction and a width occupied by the operation instruction portions in their arrangement direction irrespective of the size of the display device.

The operation instruction picture may include a picture imitating said at least the portion of the input device.

According to such embodiment, it is possible to grasp the relationship between the input device and the operation instruction device more easier.

A plurality of operation portions may be arranged in the operation object range in a right-and-left direction when viewed from the operator, a plurality of operation instruction portions, which are associated with the plurality of operation portions, respectively, may be provided in the right-and-left direction in the display area, and the device for changing may change a width of the operation instruction picture with respect to the right-and-left direction in accordance with the instruction from the operator. In this case, it is possible to properly adjust a width occupied by the operation instruction portions in the operation instruction picture with respect to the right-and-left direction to the width of the operation object range on the input device.

The plurality of operation portions and the plurality of operation instruction portions in the operation instruction picture may be associated with each other to keep a one-to-one relationship therebetween, and the device for changing may change the width of the operation instruction picture so as to generally adjust a width occupied by the plurality of operation instruction portions in the operation instruction picture in the right-and-left direction to a width occupied by the plurality of operation portions in the right-and-left direction. In this case, it is possible to adjust the width of the operation instruction picture to that of the input device, thereby providing an intuitively and easily understandable operation instruction system.

An adjustment range of the width of the operation instruction picture by the device for changing may be determined to generally adjust the width occupied by the plurality of operation instruction portions in the operation instruction picture in the right-and-left direction to the width occupied by the plurality of operation portions in the right-and-left direction with respect to a plurality of display devices with different sizes. According to such embodiment, even though the screen size of the display device changes, it is possible to adjust the width of the operation instruction picture to that of the input device, thereby providing an intuitively and easily understandable operation instruction system.

According to another aspect of the present invention, there is provided an operation instruction system comprising: a device for causing a display device to display a picture imitating an input device in a display area thereof; a device for generating a visual change in the picture imitating the input device to instruct an operator in an operation position of the input device; and a device for changing a ratio of the picture imitating the input device in the display area in accordance with an instruction from the operator.

In this case, it is possible to change the size of the picture imitating the input device in accordance with the instruction from the operator. Therefore, a correspondence relationship between the input device and the picture imitating the input device can be set to a state preferable for the operator. As is discussed above, the visual change to be generated in the operation instruction picture may be generated by various means such as means for generating a change like a dynamic picture on a specific position in the operation instruction picture to thereby indicate an operation, means for changing colors, means for lighting, means for blinking, or the like.

According to further aspect of the present invention, there is provided a computer readable storage medium storing a program for causing a computer to provide an operator with an instruction of an operation to an input device, said program being configured to cause the computer to serve as devices for: causing a display device to display, in a display area thereof, an operation instruction picture associated with an operation object range defined in at least a portion of the input device; generating a visual change in the operation instruction picture to instruct an operator in an operation position of the input device; and changing a ratio of the operation instruction picture in the display area in accordance with an instruction from the operator.

In the above storage medium according to the present invention, the program may be adapted to a case that the input device has a plurality of operation portions in the operation object range, and a plurality of operation instruction portions, which are associated with the plurality of operation portions, respectively, may be provided in the operation instruction picture in an arrangement correlative to an arrangement of the plurality of operation portions. The program may be adapted to a case that the plurality of operation portions are provided to be arranged in at least one direction, the device for changing may change, in accordance with the instruction from the operator, a size of the operation instruction picture with respect to an arrangement direction of the plurality of operation instruction portions, and said arrangement direction corresponds to an arrangement direction of the plurality of operation portions. The operation instruction picture may include a picture imitating said at least the portion of the input device. The program may be adapted to a case that a plurality of operation portions are arranged in the operation object range in a right-and-left direction when viewed from the operator, a plurality of operation instruction portions, which are associated with the plurality of operation portions, respectively, may be provided in the right-and-left direction in the display area, and the device for changing may change a width of the operation instruction picture with respect to the right-and-left direction in accordance with the instruction from the operator. The plurality of operation portions and the plurality of operation instruction portions in the operation instruction picture may be associated with each other to keep a one-to-one relationship therebetween, and the device for changing may change the width of the operation instruction picture so as to generally adjust a width occupied by the plurality of operation instruction portions in the operation instruction picture in the right-and-left direction to a width occupied by the plurality of operation portions in the right-and-left direction. An adjustment range of the width of the operation instruction picture by the device for changing may be determined to generally adjust the width occupied by the plurality of operation instruction portions in the operation instruction picture in the right-and-left direction to the width occupied by the plurality of operation portions in the right-and-left direction with respect to a plurality of display devices with different sizes.

According to still further aspect of the present invention, there is provided a computer readable storage medium storing a program for causing a computer to provide an operator with an instruction of an operation to an input device, said program being configured to cause the computer to serve as devices for: causing a display device to display a picture imitating the input device in a display area thereof; generating a visual change in the picture imitating the input device to instruct an operator in an operation position of the input device; and changing a ratio of the picture imitating the input device in the display area in accordance with an instruction from the operator.

In the present invention, the display area of the display device means a screen area to be defined by a function provided in the display device itself. The device for changing the size of the operation instruction picture or the picture imitating the input device does not imply a device changing a size of the display area itself. The storage medium includes various storage means such as a magnetic storage medium, an optical storage medium, a magneto-optical storage medium, a semiconductor storage device or the like.

DESCRIPTION OF THE PREFERRED EMBODIMENTS

Figure 1:
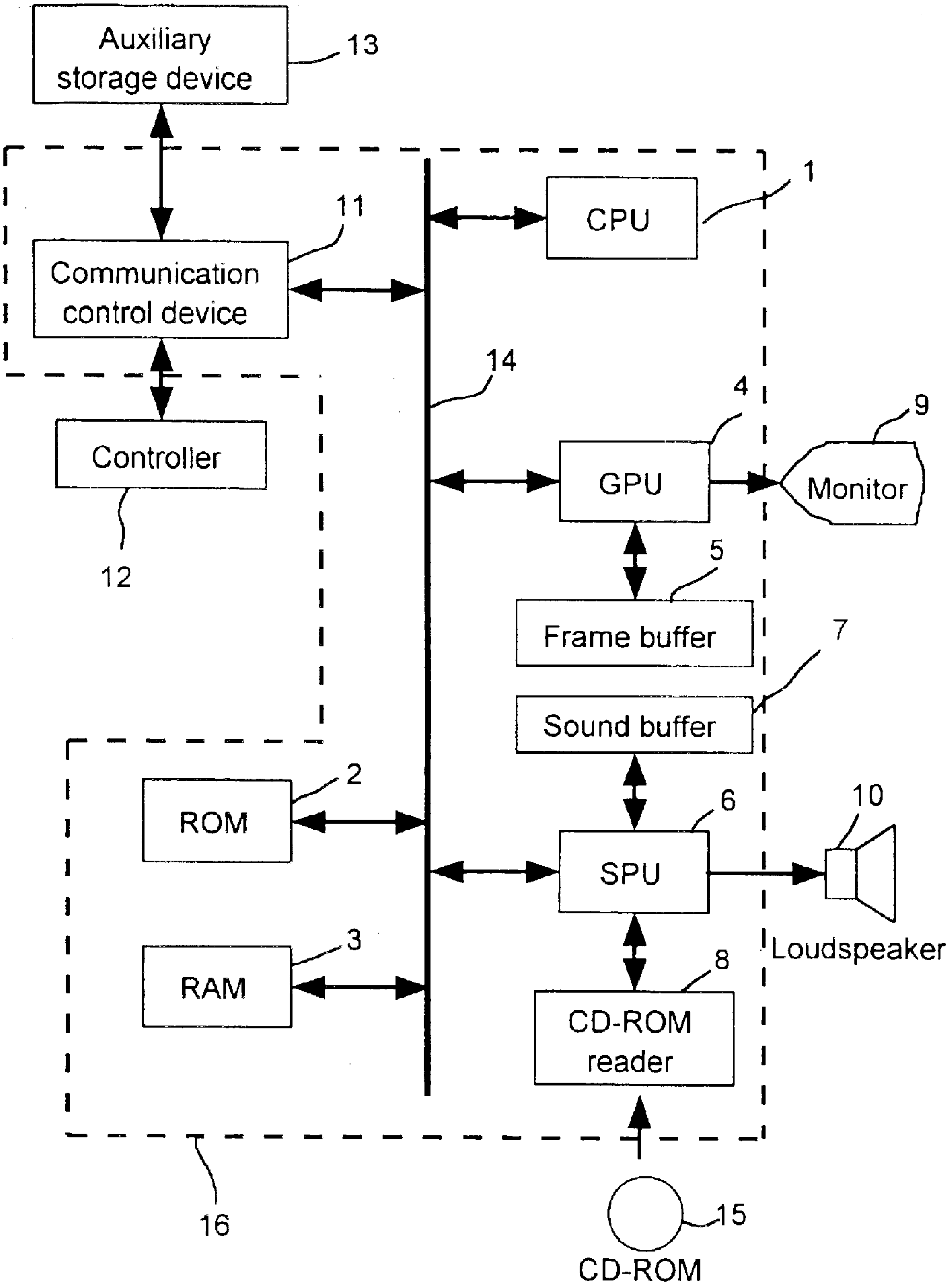
FIG. 1 is a functional block diagram of a household game machine provided as one embodiment of the present invention.

Now, an embodiment in which a present invention is applied to a household game machine will be described with reference to FIGS. 1 to 5. FIG. 1 is a functional block diagram as an example of a household game machine. This household game machine performs a predetermined game in accordance with a game program stored in a CD-ROM 15 as a storage medium. The game system comprises a CPU 1 using a microprocessor, a ROM2 and RAM 3 as a main storage device to the CPU 1, a graphics processing unit (GPU) 4 for graphics processing and a sound processing unit (SPU) 6 for sound processing, buffers 5 and 7 for respective units, and a CD-ROM reader 8. The ROM 2 stores an operating system as a program necessary for entire operation control of a game machine. The RAM 3 stores, on demand, a game program or data read out from the CD-ROM 15 as a storage medium. The GPU 4 receives image data from the CPU 1, renders a game picture on the buffer 5, converts the image data into predetermined video reproduction signals, and outputs those signals to a monitor 9. The SPU6 reproduces data of voice, musical sound or the like, data of sound sources and the like which are read out from the CD-ROM 15 and stored in the sound buffer 7, and outputs them from a loudspeaker 10. The CD-ROM reader 8 reads out the program and data recorded on the CD-ROM 15 in accordance with an instruction from the CPU 1, and outputs signals corresponding to the readout contents. On the CD-ROM 15 are stored the program and data necessary for execution of the game. A household television set is used as the monitor 9, and a built-in loudspeaker thereof is used as the loudspeaker 10.

Further, a communication control device 11 is connected via a bus 14 to the CPU 1, and a controller 12 and an auxiliary storage device 13 are detachably connected to the device 11. The controller 12 serves as an input device, and is provided with input members to accept operation of a player. The communication input device 11 scans an operation state of the controller 12 at a certain cycle (for example 1/60 seconds), and outputs signals corresponding to a scanning result to the CPU 1. The CPU 1 determines the operation state of the controller 12 base on those signals. A plurality of controllers 12 and auxiliary storage devices 13 can be connected to the communication control device 11 in parallel.

In the above described structure, elements except the monitor 9, the loudspeaker 10, the controller 12, the CD-ROM 15 and the auxiliary storage device 13 are integrally housed in a predetermined housing to thereby constitute a game machine main body 16. The game machine main body 16 serves as a computer.

The game executed in accordance with a game program recorded on the CD-ROM 15 is the so-called music simulation game in which a music performance data recorded on the CD-ROM 15 is outputs from the SPU 6 to the loudspeaker 10 to reproduce a BGM based on the performance data, operation on the controller 12 to be in time to the BGM is visually instructed to a player through the monitor 9, and proper music is mixed with the BGM if the player operates the controller 12 in accordance with the instruction, thereby allowing the player to experience feeling of performing a musical instrument.

Figure 2:
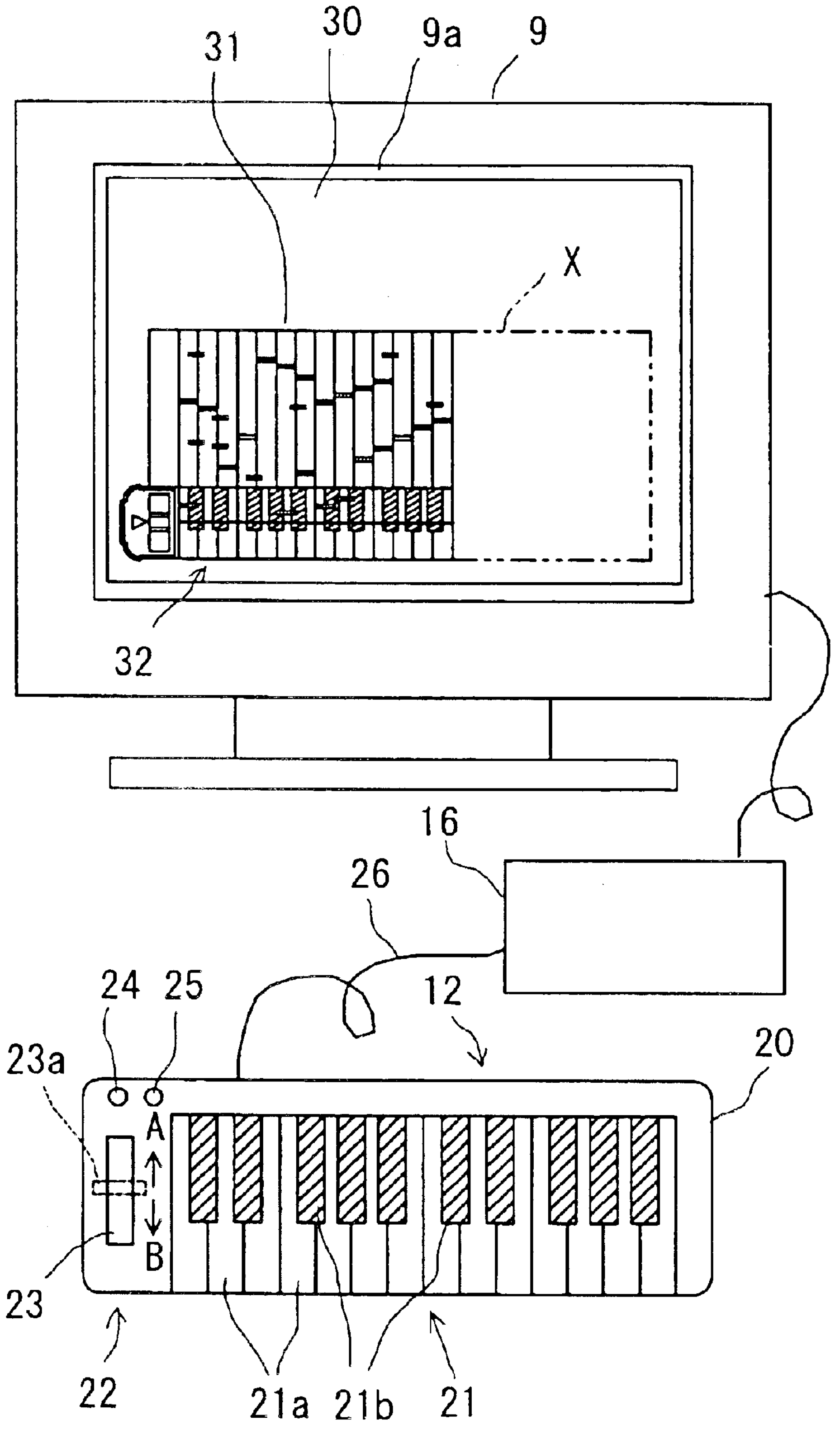
FIG. 2 is a diagram showing a state of connecting a controller and a monitor with a game machine main body of FIG. 1.

FIG. 2 shows a state in which the controller 12 and the monitor 9 are connected with the game machine main body 16. The controller 12 is a dedicated controller designed for the above described music simulation game, and is configured to imitate a keyboard instrument in this example, of course, the controller 12 is not limited to one imitating the keyboard instrument, and may imitate various musical instruments (for example, a drum set, a guitar or the like).

The controller 12 shown in FIG. 2 has a housing 20, for example made of resin, and the housing 20 is provided with a keyboard portion 21, a wheel portion 22, and push button switches 24 and 25. A true keyboard instrument is diverted to the keyboard portion 21, and the portion 21 has fourteen white keys 21*a* . . . 21*a* and ten black keys 21*b* . . . 21*b* corresponding to two octaves. These are capable of being depressed like those of the musical instruments. For example, it is possible to use a MIDI keyboard as the keyboard portion 21, and MIDI signals output therefrom may be converted through an interface to signals available to the game machine main body 16.

The wheel portion 22 comprises a wheel 23 rotatably operable about a rotation shaft 23*a* extending in a right-and-left direction in FIG. 2. The rotation shaft 23*a* is arranged in the housing 20, so that at least lower half of the wheel 23 is accommodated in the housing 20. A player (operator) can rotatably operate the wheel 23 in a front-and-rear direction (directions indicated by arrows A and B in FIG. 2) with putting a finger on an upper surface thereof. The white keys 21*a*, the black keys 21*b* and the wheel 23 are provided as operation portions used in a game play. Also, the push button switches 24 and 25 are provided as operation portions through which a start, an interruption or the like is instructed. The controller 12 transmits signals associated with operation states of these white keys 21*a*, black keys 21*b*, wheel 23 and push button switches 24 and 24 through a signal conductor 26 to the game machine main body 16. With respect to the white keys 21*a* and black keys 21*b*, signals indicating a key stroke and a key release are output, while signals indicating a rotation amount and a rotation direction are output with respect to the wheel 23.

During a game play to be executed in accordance with the game program recorded on the CD-ROM 15, a game picture 30 is displayed on a screen 9*a* of the monitor 9. In the game picture 30, there is included an operation instruction picture 31 for instructing operation of the controller 12. The view of the operation instruction picture 31 is shown in FIG. 3.

Figure 3:
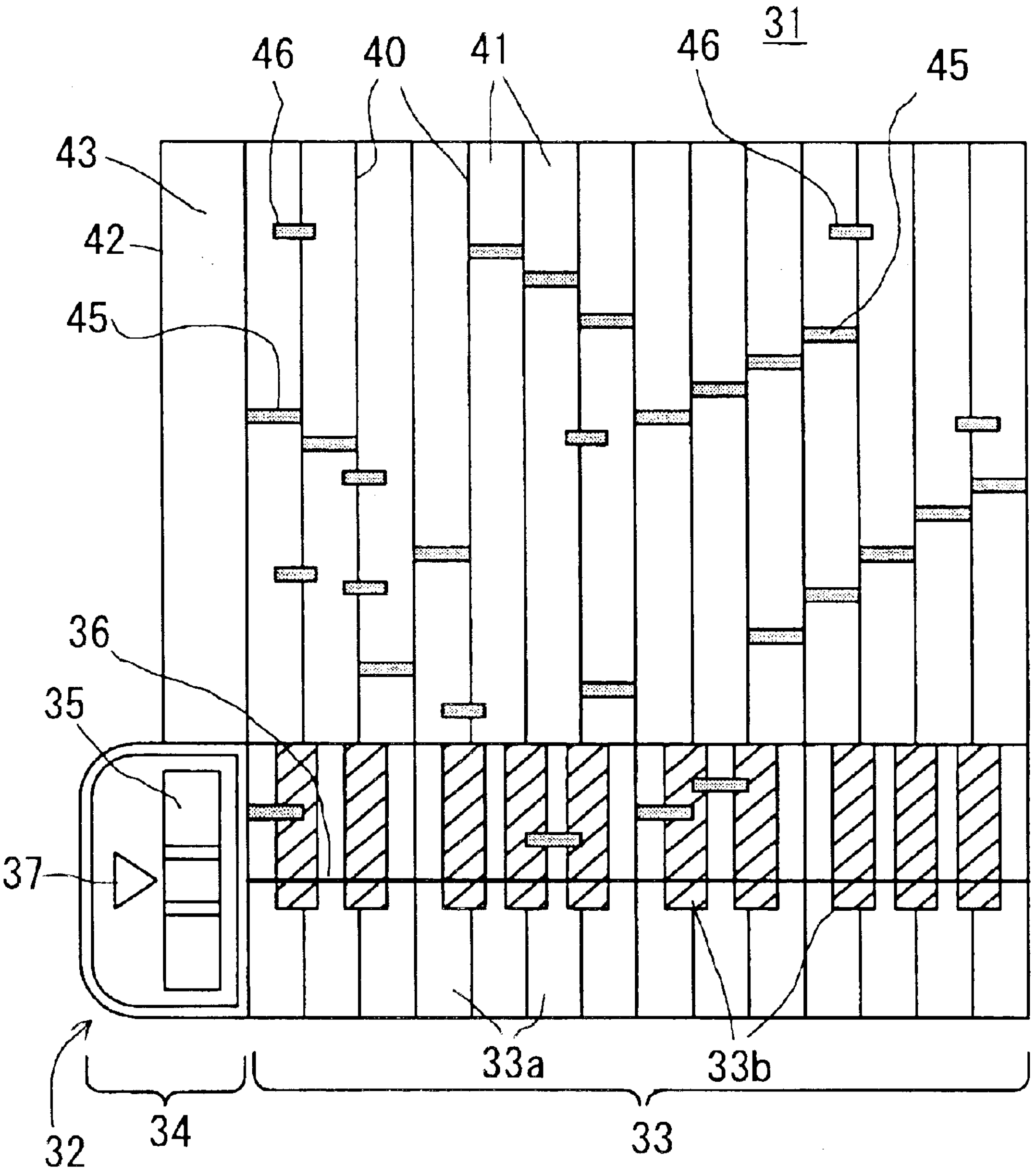
FIG. 3 is a diagram showing an operation instruction picture displayed in a game picture.

As is apparent from FIG. 3, in a lower portion of the operation instruction picture 31, there is provided a controller picture 32 having a correspondence relationship to the controller 12 as an input device. The controller picture 32 includes a keyboard picture 33 corresponding to the keyboard portion 21 of the controller 12 and a wheel picture 34 corresponding to the wheel portion 22. The keyboard picture 33 includes virtual white keys 33*a* and black keys 33*b* corresponding to the white keys 21*a* and black keys 21*b* of the actual keyboard potion 21, respectively. Also, the wheel picture 34 includes a virtual wheel 35 corresponding to the actual wheel 23. With respect to a correspondence relationship between these pictures and the respective portions of the actual keyboard portion 21 in external views thereof, it is not necessary to keep complete sameness therebetween, and it is acceptable to keep the sameness in a level that a player can grasp a correspondence relationship between the operation portions of the controller 12 and the operation portions in the controller picture 32 at a first sight. For example, it may possible to allow the player to distinguish the correspondence relationship between the controller 12 and the controller picture 32 by providing sameness with respect to a configuration or color of each operation portion, or providing sameness with respect to a letter or a mark attached to each operation portion.

In the controller picture 32, there is displayed a reference line 36 traversing the keyboard picture 33 in its right-and-left direction (key arrangement direction), and a reference mark 37 is displayed beside the wheel picture 34 with its position being coincided with the reference line 36 in a vertical direction. These reference line 36 and the reference mark 37 serve as reference signs for indicating an operation time of the controller 12.

Above the keyboard picture 33, there are displayed partition lines 40 . . . 40 extending in the vertical direction to accord with boundary positions of the white keys 33*a*. By these partition lines 40, there are provided areas 41 . . . 41 of the same numbers as those of the white keys 33*a* above the keyboard picture 33 in the operation instruction picture 31. Also, above the wheel picture 35, there are displayed partition lines 42 to thereby provide an area 43. Accordingly, the areas 41 . . . 41 correspond to the actual white keys 21*a* . . . 21*a* with a one-to-one relationship through the virtual white keys 33*a* . . . 33*a*, while the area 43 corresponds to the actual wheel 23 through the virtual wheel 35. Further, the partition lines 40 . . . 40 correspond to the virtual black keys 33*b* . . . 33*b* with a one-to-one relationship.

In each area 41, there are displayed objects 45 . . . 45 as movable signs, which are flat in the right-and-left direction, and on the partition lines 40 (but only on lines overlapping the black keys) are displayed the similar objects 46. The similar object is displayed in the area 43, but its illustration is omitted in FIG. 3. Each of the objects 45 and 46 appears in the upper end of the operation instruction picture 31 at a predetermined time during the musical performance of the BGM, and then gradually goes down in a tempo in compliance with the BGM. When the object 45 has reached the reference line 36, an operation time of the white key 21*a* corresponding to the area 41 in which the object 45 is displayed has just come. Similarly, when the object 46 has reached the reference line 36, an operation time of the black key 21*b* corresponding to the partition line 40 in which the object 46 is displayed has just come. Similarly, the consistency between the object in the area 43 and the reference mark 37 is associated with an operation time of the wheel 23.

As is discussed in the above, in the operation instruction picture 31, the player is allowed to grasp an operation position on the controller 12 with referring a correspondence relationship between display positions of the objects 45 or 46 in the right-and-left direction and the keyboard picture 33 or the wheel picture 34. Accordingly, if the width of the operation instruction picture 31 seen on the monitor 9 in the right-and-left direction coincides with the width of the operation portion (the keyboard portion 21 and the wheel portion 23) of the actual controller 12, the player can intuitively grasp a correspondence relationship among the objects 45 and 46, the white keys 21*a*, the black keys 21*b* and the wheel 23. Such setting is possible if the size of the screen 9*a* of the monitor 9 is fixed at a certain value.

However, in the household game machine, a television set is generally used as the monitor 9, so that the size of the screen 9*a* is not fixed. Accordingly, if the ratio of the width (the dimension in the right-and-left direction) of the operation instruction picture 31 to the game picture 30 is fixed at a certain value, the actual display width of the operation instruction picture 31 changes in accordance with the size of the monitor 9, so that there may be an excessive deviation between the width of the operation instruction picture 31 and the width of the operation portion of the controller 12.

In this embodiment, to avoid such disadvantage, as indicated by a phantom line X in FIG. 2, the width of the operation instruction picture 31 can be adjusted in the game picture 30 in accordance with an instruction of an operator. One example of the way to change the width of the operation instruction picture 31 like the above may contain the steps of preparing a parameter (hereinafter referred to as a width setting value) designating the width of the operation instruction picture 31 in the game picture 30, allowing the width setting value to be changed in accordance with setting operation of a player, and adding a procedure of determining the width of the operation instruction picture 31 in the game picture 30 based on the width setting value to a program for displaying the game picture 30.

Figure 4:
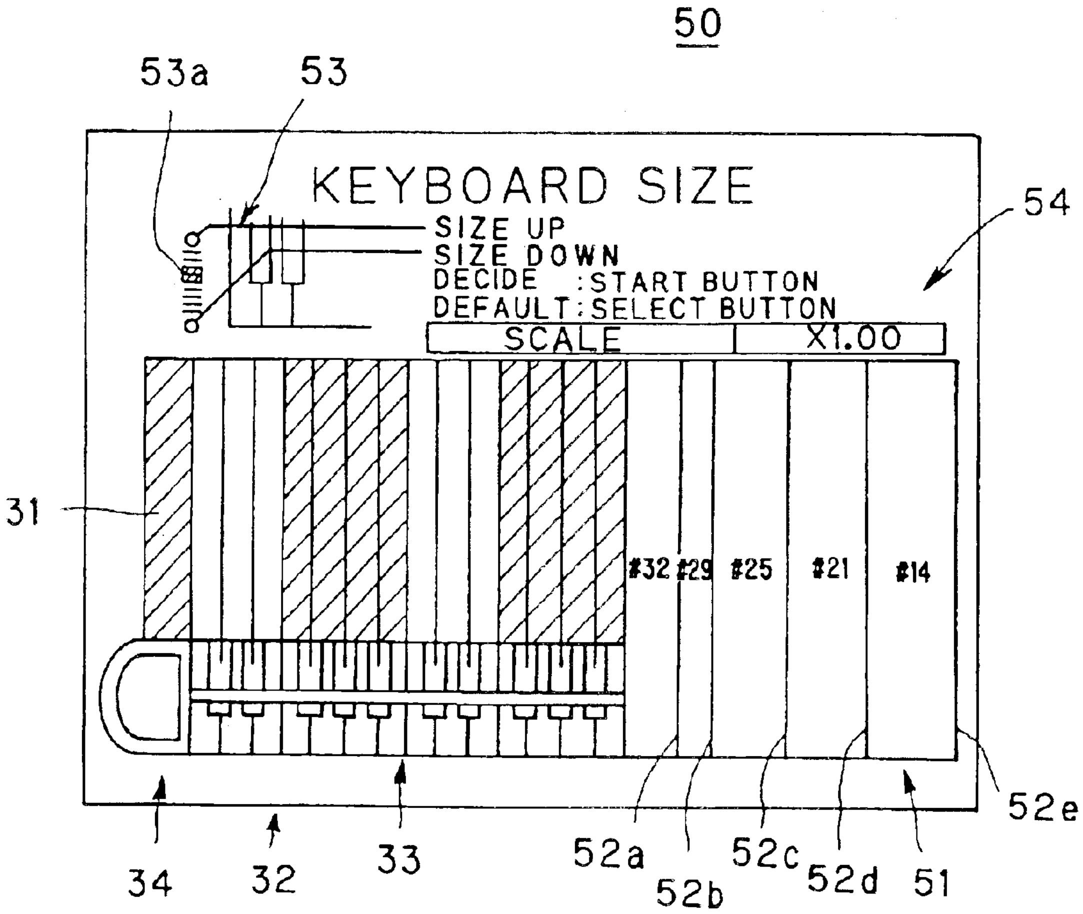
FIG. 4 is a diagram showing an adjustment picture displayed when adjusting width of the operation instruction picture.

FIG. 4 shows a configuration of an adjustment picture 50 to be displayed when adjusting the width of the operation instruction picture 31. In the adjustment picture 50, there is displayed the operation instruction picture 31 which has been described in FIG. 3. The operation instruction picture 31 is displayed in the adjustment picture 50 in a left adjusted manner, and a space to expand the operation instruction picture 31 is reserved on the right side thereof. In the space 51, there are displayed scale lines 52*a* . . . 52*e* for indicating right-end-positions of the operation instruction picture 31 in the case where the width of the keyboard picture 33 and the width of the keyboard portion 21 substantially accord with each other, and numerals or marks indicating the size of monitor 9 are displayed therewith. For example, if a monitor having a size of 21 inches in its diagonal direction is used, the width of the operation instruction picture 32 and the width of the keyboard portion 21 generally accord with each other by adjusting the right end of the operation instruction picture 31 to the scale line 52*d* with a sign of "#21".

Above the adjustment picture 50, there are provided an operation guidance portion 53 for guiding an adjustment operation of the operation instruction picture 31 and a magnification indication portion 54 for indicating a display magnification of the operation instruction picture 31. In this example, the width of the operation instruction picture 31 increases when the wheel 23 is rotated to the direction indicated by the arrow A in FIG. 2, while the width of the operation instruction picture 31 decreases when the wheel 23 is rotated to the direction indicated by the arrow B in FIG.

2. Therefore, a picture 53*a* indicating the wheel 23 is displayed in the operation guidance portion 53, and letters of "SIZE UP" and "SIZE DOWN" are displayed so as to be associated with respective upper and lower ends of the picture 53*a*, to thereby show which direction the wheel 23 is to be operated to expand or reduce the picture 31. The display magnification displayed in the magnification indication portion 54 indicates a magnification of the of the width of the operation instruction picture 31 to an initial value thereof. The initial value is applicable to a state in which the width of the operation instruction picture 31 are adjusted in accordance with a monitor of a maximum size. Namely, a minimum value of the ratio of the operation instruction picture 31 to the game picture 30 in its width direction is set as the initial value. However, it is not necessary to set the initial value to such value.

Figure 5:
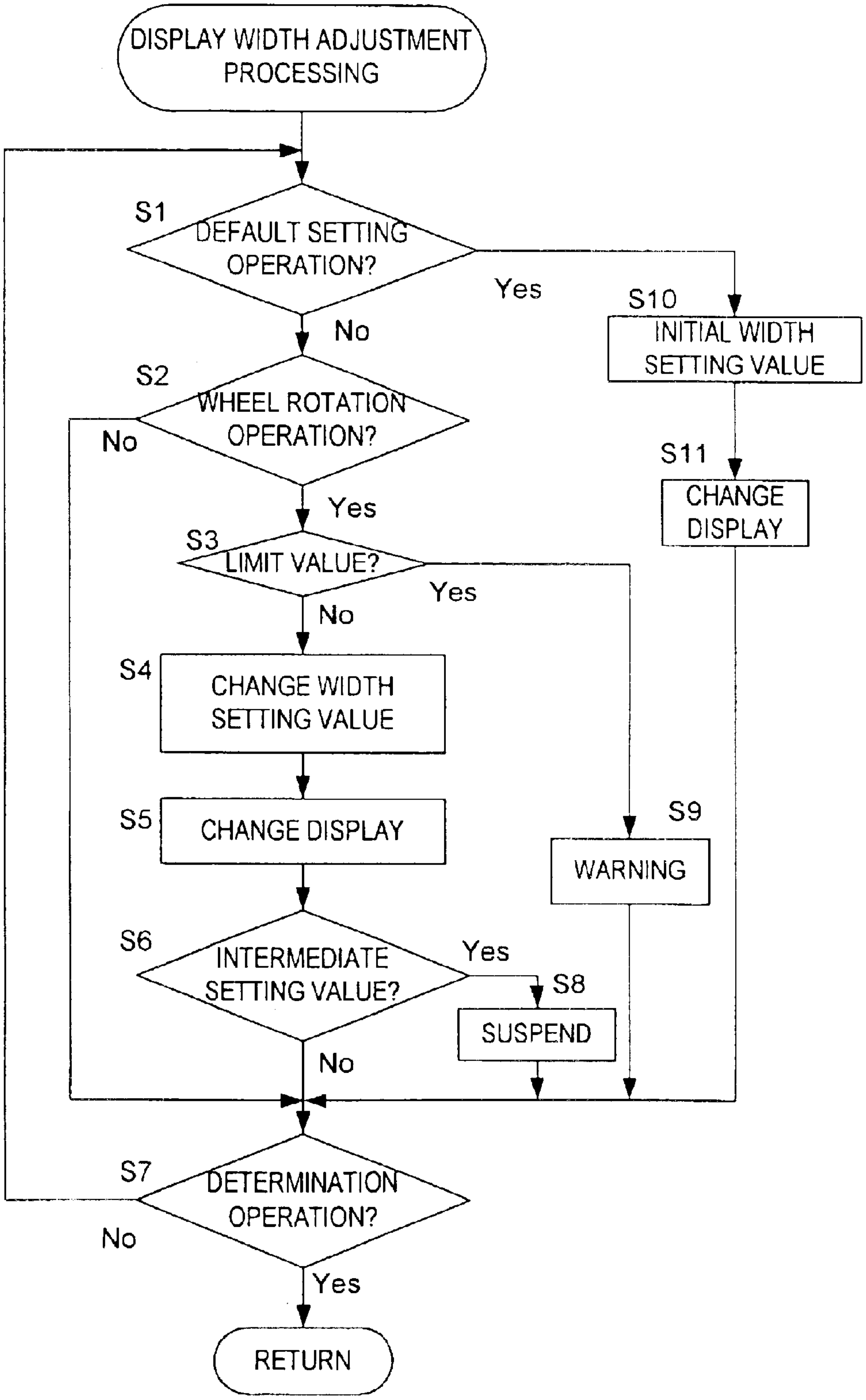
FIG. 5 is a flowchart showing a procedure for adjusting the width of the operation instruction picture.

FIG. 5 shows processing executed by the CPU 1 to change the width of the operation instruction picture 31. This processing is executed, for example, in the case where an item of changing display width is prepared in a game menu picture or a sub-menu picture to be selected from the menu picture, and the item is selected. When executing this processing, there is displayed the adjustment picture 50 shown in FIG. 4 is displayed on the monitor 9. After starting the processing, it is judged at step S1 whether or not initial setting operation (for example depressing operation of the push button switch 24), and if a negative judgment is done, then it is judged whether or not rotational operation of the wheel 23 is done (step S2). In case that the rotational operation has been done, it is judged whether or not the width setting value is a limit value in an adjustment possible range (step S3). To describe concretely, in the case that the wheel 23 is operated in a direction for increasing the width of the picture 31, it is judged whether or not the width reaches a maximum value in the adjustment possible range, while in the case where the wheel 23 is operated in a direction for decreasing the width of the picture 31, it is judged whether or not the width reaches a minimum value in the adjustment possible range.

If a negative judgment has been made at step S3, the width setting value is increased or decreased at a predetermined unit amount in accordance with the rotation direction of the wheel 23 (step S4). Continuing that, the operation instruction picture 31 in the adjustment picture 50 is expanded or reduced based on the width setting value after being changed (step S5). After that, it is judged whether or not the width setting value accords with any one of predetermined intermediate setting values (step S6). Each of the intermediate setting values is a value when the right end of the operation instruction picture accords with any one of the scale lines 52*b*–52*d* in FIG. 4.

When the width setting value does not accord with the intermediate setting value, it is judged at step S7 whether or not determination operation (for example depressing operation of the push button switch 25) is done, and if a negative judgment has been made, then the processing returns to step S1. If it is judged at step S6 that the width setting value accords with the intermediate setting value, then the processing goes to step S8, and width changing operation is temporary suspended (for example one second pending). During this time, the instruction picture 31 is not changed even if the wheel 23 keeps rotating. By doing this, it is easy to adjust the instruction picture 31 with any one of the scale lines 51*b*–51*d*. After releasing the pending, the processing goes to step S7.

If an affirmative judgment has been made at step S3, warning is done to indicate that further width changing operation is not possible (step S9), and after that, the processing goes to step S7. The warning may carry out by employing various warning means, such as means for displaying an message, calling attention by sound or the like, alone or jointly. If the affirmative judgment has been made at step S1, the width setting value is set to the initial value (step S10), and the width of the operation instruction picture 31 in the adjustment picture 50 is changed to the initial value (step S11). After that, the processing goes to step S7.

If it has been judged at step S7 that the determination operation has been done, the display width adjustment processing is terminated The width setting values set through the above described processing is stored in a predetermined area in the RAM 3, and is used as a value defining the width of the operation instruction picture 31 when displaying the game picture 30 after in a subsequent game. The width setting value may be recorded in the auxiliary storage device 13 in accordance with operation of the player.

The present invention is not limited to a system which indicates operation using the above described operation instruction picture 31, and can be carried out in various embodiments. For example, the operation instruction picture 31 may be a picture in which the objects 45 and 46 are fixed, while the reference line 36 is scrolled to indicate operation time. The present invention may be embodied as a system in which displays of the partition lines 40 and 42 are omitted, while allowing a player to grasp operation positions by the objects 45 and 46 and the controller picture 32. Further, the controller picture 32 and the partition lines 40 and 42 may be omitted, and which position of the controller 12 should be operated is indicated only by positions of the objects 45 and 46 in the right-and-left direction.

The input device is not limited to one in which operation positions are arranged in right-and-left direction, but the operation portions can be arranged to form an annular shape, a matrix, or a zigzag line. In these cases, the operation instruction picture may have an arrangement associated with the arrangement of the operation portions. For example, if the operation portions of the input device are arranged to form an annular shape, it is supposed that the operation instruction picture may be displayed as a picture of an annular shape. In this case, it is preferable to change a diameter of the annular shape picture in accordance with the size of a monitor.

Figure 6:
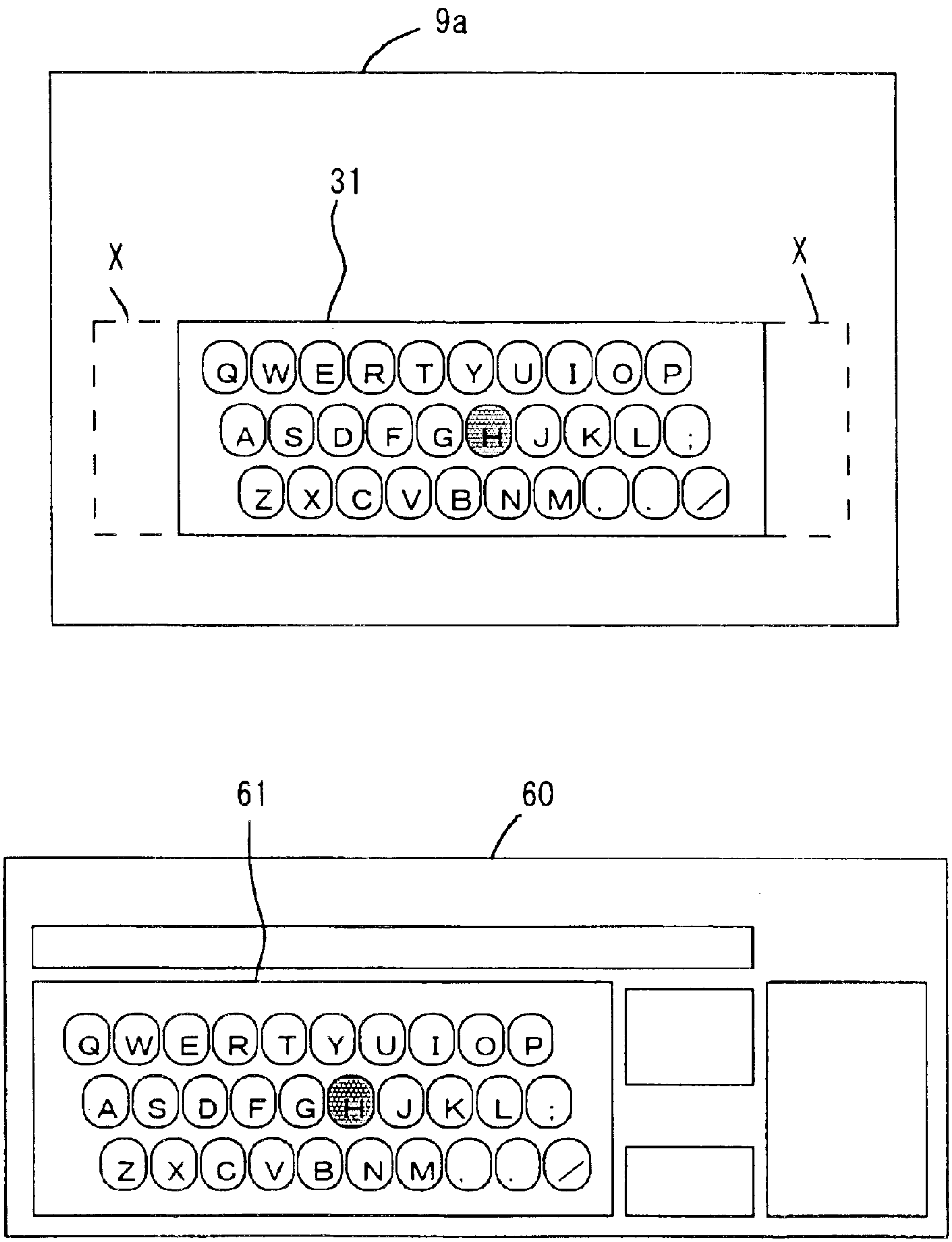
FIG. 6 is a diagram showing an application to a typing practice system.

The present invention is not limited to a music simulation game system, but can be adapted to various types of amusement systems and the like, as long as the system employs an operation instruction method using a picture associated with the input device to indicate to a player a position to be operated. As shown in FIG. 6, in the so-called typing practice system in which an operation instruction picture 31 imitating a key arrangement of a typing device is displayed on the screen 9*a* of the monitor 9, and a key to be operated is displayed in a different state (for example, color or blink) than that of the other keys to let an operator practice typing operation, it is possible to allow the payer to easily grasp an operation position by expanding or reducing the operation instruction picture 31 as shown by a phantom line X in FIG. 6 to generally accord the size of the operation instruction picture 31 with a practice range on a keyboard 60. The present invention is not limited to a household game machine, but is applied to an amusement machine to be installed in a game arcade.

As is discussed in the above, according to the present invention, since the size of an operation instruction picture or a picture imitating an input device in a display area of a display device can be adjusted in accordance with an instruction from an operator, it is possible to properly set a correspondence relationship between the input device and the operation instruction device, even in a circumstance that the size of the display area of the display device or the input device is not fixed at a certain value. Also, it is possible to provide an operation instruction system according to the present invention by making a computer read out a program recorded on a storage medium according to the present invention and execute that program.

What is claimed is:

1. A display device system for driving a display having one of a plurality of predetermined sizes to instruct an operator in operation of an input device having operation input portions arranged in a horizontal direction corresponding to a horizontal display direction and at predetermined input portions spacings, the display device system comprising:

- a display device for displaying an operation instruction picture on the display showing:
  - an operation instruction area having operation instruction indicators which indicate to the operator operations of the operation input portions to be executed and which are arranged in the horizontal direction over a width of the operation instruction area in a one-to-one correspondence with the operation input portions of the input device; and
  - a plurality of scale indicators corresponding respectively to said plurality of predetermined sizes of the display device; and
- a control device responsive to an operator input selecting one of said plurality of scale indicators, corresponding to the display, for adjusting only a width of the operation instruction area in the horizontal direction such that spacings of the operation instruction indicators on the display substantially equal the predetermined input portions spacings of the operation input portions and such that the width of the operation instruction area substantially equals a width range of the arrangement of the operation input portions.

2. The display device system of claim 1 wherein said plurality of scale indicators are arranged on the display to indicate varying widths of said operation instruction area.

3. The display device system of claim 2 wherein said control device accepts the operator input selecting widths of the operation instruction area which do not correspond to said plurality of scale indicators and provides a visual indication when a selected width corresponds to one of said plurality of scale indicators.

4. The display device system of claim 1 wherein said control device accepts the operator input selecting widths of the operation instruction area which do not correspond to said plurality of scale indicators and provides a visual indication when a selected width corresponds to one of said plurality of scale indicators.

5. A computer readable storage medium storing an executable program for driving a display having one of a plurality of predetermined sizes to instruct an operator in operation of an input device having operation input portions arranged in a horizontal direction corresponding to a horizontal display direction and at predetermined input portions spacings, the program comprising steps for:

- displaying an operation instruction picture on the display showing:
  - an operation instruction area having operation instruction indicators which indicate to the operator operations of the operation input portions to be executed and which are arranged in the horizontal direction over a width of the operation instruction area in a one-to-one correspondence with the operation input portions of the input device; and
  - a plurality of scale indicators corresponding respectively to said plurality of predetermined sizes of the display device; and
- adjusting only a width of the operation instruction area in the horizontal direction such that spacings of the operation instruction indicators on the display substantially equal the predetermined input portions spacings of the operation input portions and such that the width of the operation instruction area substantially equals a width range of the arrangement of the operation input portions in response to an operator input selecting one of said plurality of scale indicators, corresponding to the display.

6. The recording medium of claim 5 wherein said plurality of scale indicators are arranged on the display to indicate varying widths of said operation instruction area.

7. The recording medium of claim 6 wherein said step of adjusting only a width of the operation instruction area includes accepting operator input selecting widths of the operation instruction area which do not correspond to said plurality of scale indicators and provides a visual indication when a selected width corresponds to one of said plurality of scale indicators.

8. The recording medium of claim 5 wherein said step of adjusting only a width of the operation instruction area includes accepting operator input selecting widths of the operation instruction area which do not correspond to said plurality of scale indicators and provides a visual indication when a selected width corresponds to one of said plurality of scale indicators.

* * * * *